(12) United States Patent
Wendell et al.

(10) Patent No.: US 12,391,366 B1
(45) Date of Patent: Aug. 19, 2025

(54) LEAD SCREW CONTROL ACTUATION SYSTEM

(71) Applicant: BAE SYSTEMS Information and Electronic Systems Integration Inc., Nashua, NH (US)

(72) Inventors: Ross J. Wendell, Medford, MA (US); Matthew M. Hall, Nashua, NH (US); Elizabeth A. Deloia, Westford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 18/741,399

(22) Filed: Jun. 12, 2024

(51) Int. Cl.
*B64C 13/28* (2006.01)
*B64C 39/12* (2006.01)
*B64U 10/00* (2023.01)
*F16H 37/12* (2006.01)

(52) U.S. Cl.
CPC .............. *B64C 13/28* (2013.01); *B64C 39/12* (2013.01); *F16H 37/122* (2013.01); *B64U 10/00* (2023.01)

(58) Field of Classification Search
CPC ......... B64C 13/24; B64C 13/26; B64C 13/28; B64C 13/30; B64C 13/32; B64C 13/34; B64C 13/341; B64C 13/343; B64C 13/345; B64U 10/00; F16H 21/44; F16H 25/24; F16H 25/2204; F16H 37/122; F16H 2025/2043; F16H 2025/2075; F16H 2025/2084; F42B 10/64

USPC ..................................................... 244/45 A
See application file for complete search history.

(56) References Cited

U.S. PATENT DOCUMENTS

| | | | | |
|---|---|---|---|---|
| 4,947,070 A | * | 8/1990 | Hill | G05G 7/02 74/424.89 |
| 5,249,761 A | * | 10/1993 | Schroppel | F42B 10/64 244/99.2 |
| 6,325,331 B1 | * | 12/2001 | McKeown | B64C 13/16 244/221 |
| 6,581,871 B2 | | 6/2003 | Pijaca et al. | |
| 6,726,147 B1 | * | 4/2004 | Perini | F42B 10/64 244/3.28 |
| 6,827,310 B1 | | 12/2004 | Whitham | |

(Continued)

FOREIGN PATENT DOCUMENTS

| | | |
|---|---|---|
| AU | 2017200242 B2 | 1/2017 |
| EP | 1265050 B1 | 11/2004 |

(Continued)

*Primary Examiner* — Joshua E Rodden
(74) *Attorney, Agent, or Firm* — Gary McFaline

(57) ABSTRACT

A lead screw control actuation system. A system according to an embodiment includes a motor configured to rotate a lead screw that is configured to increase torque provided by the motor. The lead screw is coupled to a nut through a threaded opening such that rotation of the lead screw causes the nut to move along a longitudinal axis of the lead screw. The nut includes a slot oriented in a direction perpendicular to the direction of motion of the nut. The system further includes a lever arm including a pin at a first end of the lever arm, the pin configured to slide in the slot of the nut to cause the lever arm to rotate in response to the motion of the nut. A second end of the lever arm is coupled to a canard such that rotation of the lever arm causes the canard to rotate.

18 Claims, 6 Drawing Sheets

(56) References Cited

U.S. PATENT DOCUMENTS

| | | | |
|---|---|---|---|
| 7,755,012 | B2 | 7/2010 | Mock |
| 8,894,003 | B2 | 11/2014 | Shai |
| 8,921,749 | B1 * | 12/2014 | Scott ................ F42B 10/14 |
| | | | 244/3.28 |
| 10,288,393 | B2 | 5/2019 | Corrado |
| 10,458,764 | B2 * | 10/2019 | Willenbring ............ F42B 10/14 |
| 11,150,062 | B1 | 10/2021 | Jankowski et al. |
| 11,548,620 | B2 | 1/2023 | Charafeddine et al. |
| 11,892,275 | B2 | 2/2024 | Silver |
| 2006/0289695 | A1 | 12/2006 | Bois et al. |
| 2013/0001357 | A1 * | 1/2013 | Cyrot .................... B64C 13/341 |
| | | | 244/99.4 |
| 2018/0072403 | A1 * | 3/2018 | Vermande ........... F16H 25/2021 |
| 2018/0194454 | A1 * | 7/2018 | Olson ....................... B64C 5/02 |
| 2020/0290723 | A1 * | 9/2020 | Tsai ........................ B64C 9/16 |
| 2022/0185448 | A1 * | 6/2022 | Rozeboom ............... B64C 5/16 |
| 2022/0380022 | A1 | 12/2022 | Roberts et al. |
| 2023/0375317 | A1 | 11/2023 | Vainshtein et al. |
| 2025/0033763 | A1 * | 1/2025 | Teyssier ................ F16H 25/205 |

FOREIGN PATENT DOCUMENTS

| | | |
|---|---|---|
| EP | 2109751 A2 | 10/2009 |
| EP | 2222551 B1 | 1/2016 |
| EP | 2707673 B1 | 11/2018 |
| EP | 3868654 B1 | 5/2023 |
| EP | 4197904 A1 | 6/2023 |
| GB | 2214882 A | 9/1989 |
| GB | 2580345 A | 7/2020 |
| WO | 2015023337 A1 | 2/2015 |
| WO | 2021251930 A3 | 12/2021 |
| WO | 2024039423 A1 | 2/2024 |

\* cited by examiner

LEAD SCREW CONTROL ACTUATION SYSTEM

STATEMENT OF GOVERNMENT INTEREST

This invention was made with United States Government assistance under Contract No. 21 C8099. The United States Government has certain rights in this invention.

FIELD OF DISCLOSURE

The present disclosure relates to canard control, and more particularly to a lead screw control actuation system.

BACKGROUND

Aircraft are able to maneuver by adjusting flight control surfaces (e.g., canards). Typically, a linkage mechanism is employed to couple a motor, or other drive source, to the canards of the aircraft. The linkage mechanism is configured to transmit motion of the motor to the canards.

Figure 1:
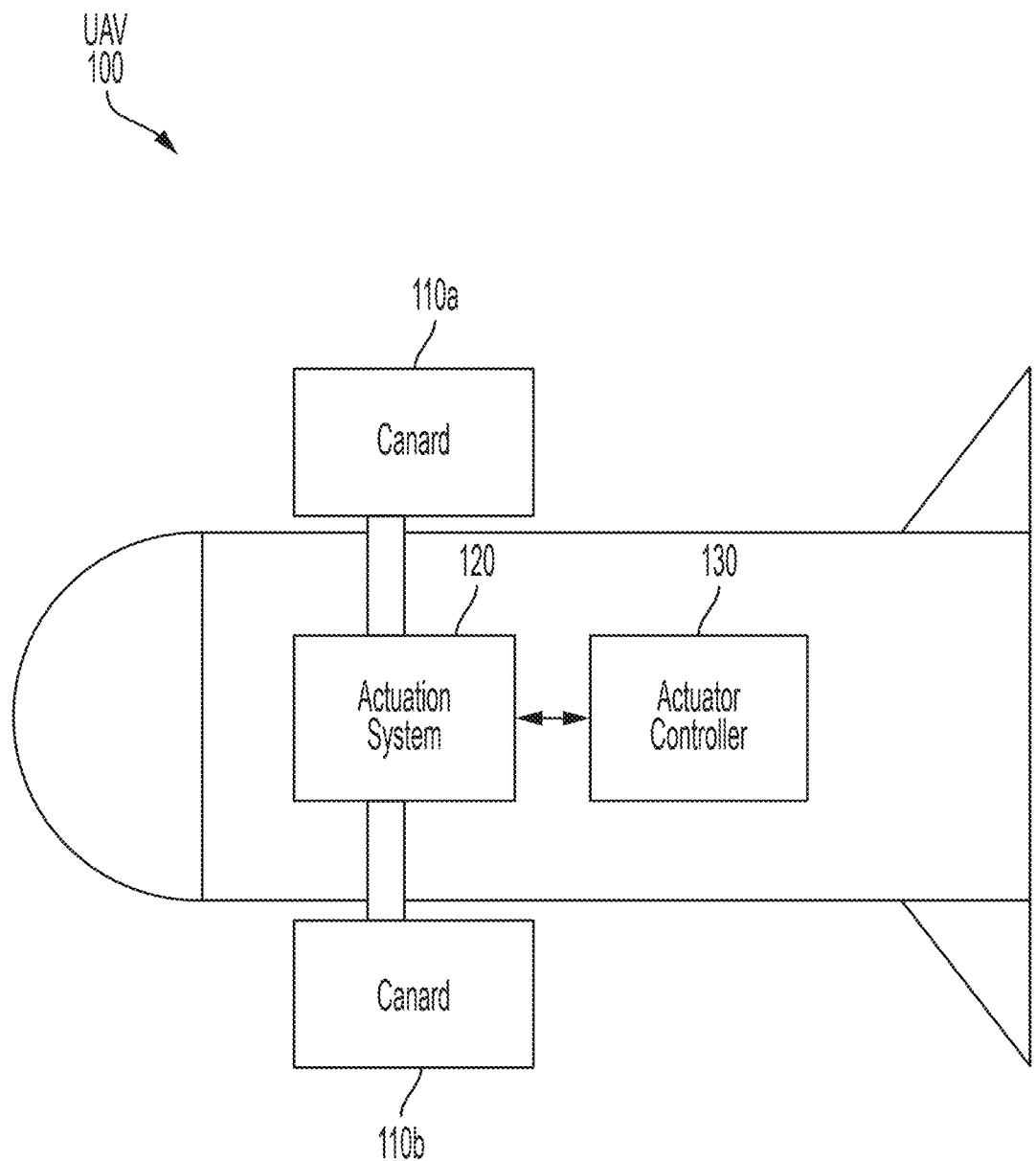
FIG. 1 illustrates an unmanned aerial vehicle (UAV) comprising a lead screw control actuation system, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for an actuation system for control of flight surfaces (e.g., canards) of an aerial vehicle. As noted above, aircraft are able to maneuver by adjusting the orientation of the canards. Typically, a linkage mechanism is employed to couple a motor, or other drive source, to the canards of the aircraft so that motion of the motor may be transmitted to the canards. In larger aircraft these linkages tend to be relatively large, complex, and expensive mechanisms that are required to provide thousands of hours of reliable service. These mechanisms are also designed to provide very high torque at low rotational speeds of the motor due to the size and weight of the canards.

In smaller aerial vehicles, such as precision guided munitions, UAVs, or drones, the mission and performance requirements can be significantly different. For example, UAVs may only need to operate reliably for a relatively short time period (e.g., a few seconds), to perform a single mission. Also, the smaller size and lighter weight of a UAV may reduce the amount of torque needed to adjust the canards. The torque may need to be applied more rapidly, however, to provide faster flight control response (e.g., a higher control bandwidth), particularly for UAVs that fly at supersonic speeds. Additionally, the linkage mechanism for a UAV may need to be more compact to fit in the smaller UAV form factor. Canards used for rudder control have similar issues when integrated into autonomous underwater vehicles (AUV).

To this end, and in accordance with an embodiment of the present disclosure, a lead screw control actuation system is disclosed which has a reduced parts count, smaller size, and lower reflected inertia at the motor which allows for higher control bandwidth. The actuation system employs a lead screw and nut in combination with a sliding interface to a rotational lever to provide precision canard control in a small form factor. The disclosed linkage design can be scaled to accommodate different operating points (e.g., UAV sizes and control bandwidths).

In accordance with an embodiment, the lead screw control actuation system includes a motor and a lead screw attached to the motor. The motor is configured to rotate the lead screw and the lead screw is configured to increase torque provided by the motor. The system also includes a nut comprising a threaded opening in a first face of the nut through which the lead screw is coupled such that the rotation of the lead screw causes the nut to move in a forward or reverse direction along a longitudinal axis of the lead screw. The direction of motion of the nut is based on the direction of rotation of the lead screw. The nut further comprises a slot in a second face of the nut. The slot is oriented in a direction perpendicular to the direction of motion of the nut. The system further includes a lever arm comprising a pin at a first end of the lever arm. The pin is configured to slide in the slot of the nut to cause the lever arm to rotate in response to the motion of the nut. A second end of the lever arm, opposite the first end, is coupled to a canard such that the lever arm rotation causes the canard to rotate.

It will be appreciated that the techniques described herein may provide an improved linkage mechanism, between the motor and the canard of a UAV, that provides a higher control bandwidth and is smaller and less expensive compared to the linkage mechanisms on larger aircraft. Additionally, the disclosed linkage design consumes no power to maintain the canards in a given position once that position has been achieved. Numerous embodiments and applications will be apparent in light of this disclosure.

System Architecture

FIG. 1 illustrates an unmanned aerial vehicle (UAV) 100 comprising a lead screw control actuation system 120, in accordance with certain embodiments of the present disclosure. The UAV 100 is shown to include right and left canards (e.g., flight control surfaces or wings) 110*a* and 110*b*, a lead screw control actuation system 120, and an actuator controller 130.

The lead screw control actuation system 120 will be described below, but at a high level, it is configured to provide a linkage between drive motors and the canards. The actuator controller 130 is configured to provide electrical signals to the drive motors to rotate the motor or motors and control the orientation of the canards over time to achieve a desired flight trajectory, or otherwise control, the flight of the UAV. In some embodiments, the actuator controller 130 may be part of a guidance system.

Figure 2:
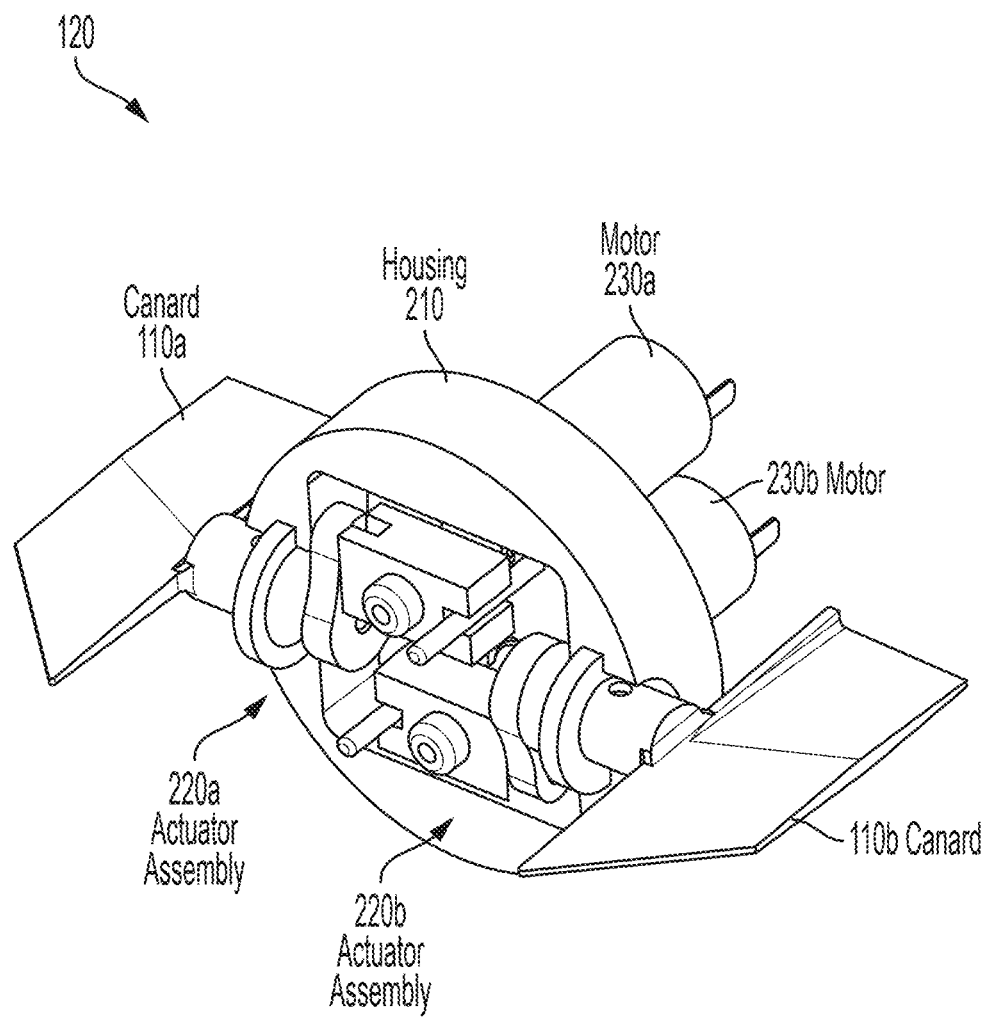
FIG. 2 is a perspective view of the actuation system of FIG. 1, configured in accordance with certain embodiments of the present disclosure.

FIG. 2 is a perspective view of the actuation system 120 of FIG. 1, configured in accordance with certain embodiments of the present disclosure. The actuation system 120 is shown to include a first actuator assembly 220a and a second actuator assembly 220b that are both mounted within a housing 210. The first actuator assembly 220a is configured to provide linkage between a first motor 230a and the first canard 110a. The second actuator assembly 220b is configured to provide linkage between a second motor 230b and the second canard 110b.

Figure 3:
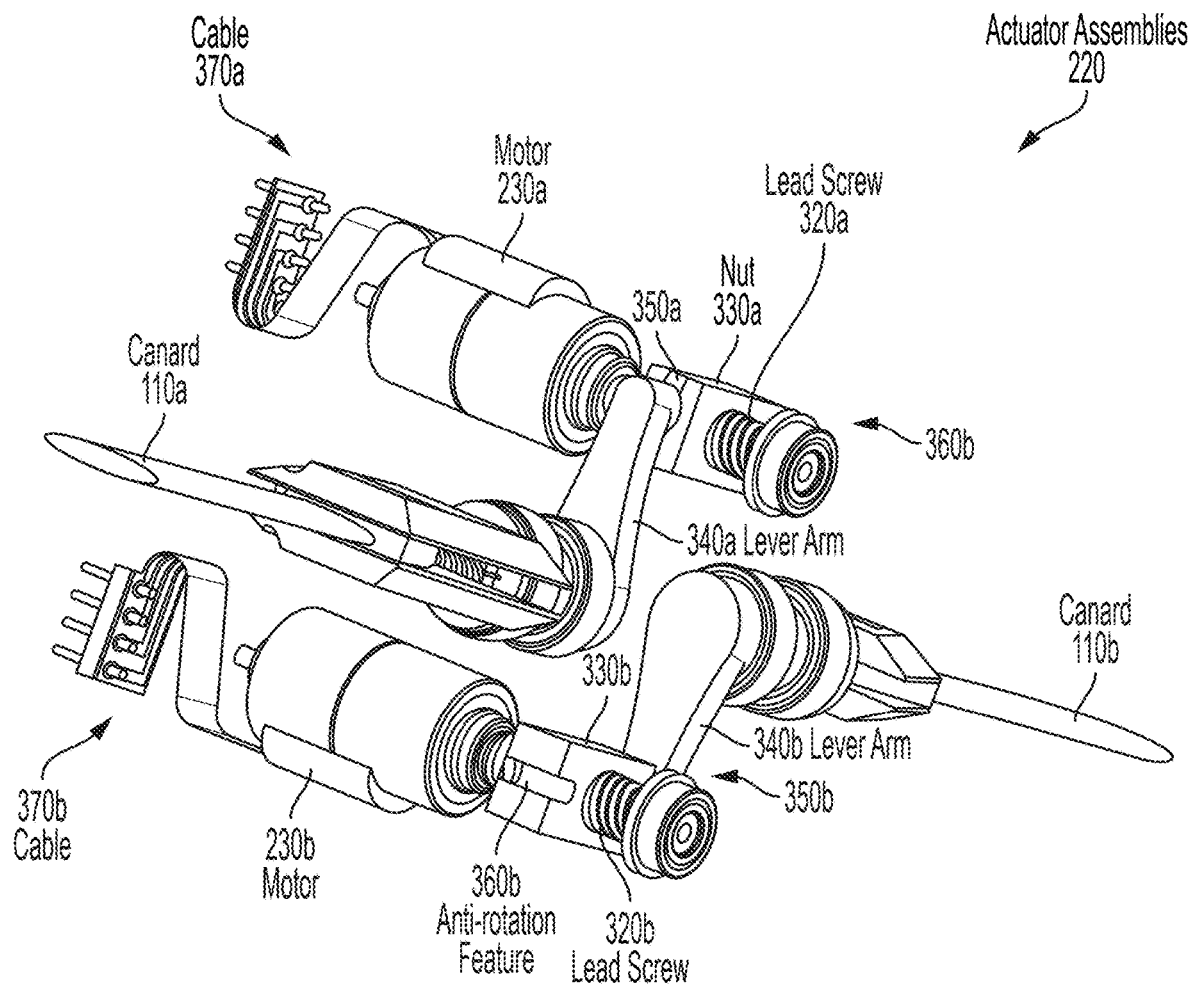
FIG. 3 is a more detailed view of the actuator assemblies of FIG. 2, configured in accordance with certain embodiments of the present disclosure.

FIG. 3 is a more detailed view of the actuator assemblies 220 of FIG. 2, configured in accordance with certain embodiments of the present disclosure. Actuator assembly 220a, which is configured to control canard 110a, is shown to include motor 230a, lead screw 320a, nut 330a, lever arm 340a, and cable 370a. Actuator assembly 220a also includes an anti-rotation feature 360a (similar to feature 360b of assembly 220b), although it is not visible in this view. Nut 330a is shown to include a slot 350a.

Motor 230a is attached to the lead screw 320a and configured to rotate the lead screw. For example, the lead screw 320a may be directly attached or otherwise integrated to the shaft of the motor 230a, eliminating the need for a geared coupling between the motor and the lead screw. Eliminating a geared coupling reduces the physical volume of the system, decreases the number of bearings that would otherwise be needed, and reduces backlash in the assembly. In some embodiments, the motor is a stepper motor configured to provide incremental angular rotations in response to pulsed electrical signals provided, for example, by the actuator controller 130.

Lead screw 320a is configured to increase the torque provided by the motor (e.g., to provide mechanical advantage). In some embodiments, the thread pitch of the lead screw is selected to match the torque and rotational speed of the motor to a required torque to be applied to the canard. Standard lead screw torque-force calculations may be used to obtain the force for a given thread pitch which may then be multiplied by the length of the lever to provide the torque at the canard. Because the lead screw trades torque for rotational speed, a high speed/low torque motor may be used that is lighter in weight.

Nut 330a comprises a threaded opening, in a first face of the nut, through which the lead screw is coupled such that the rotation of the lead screw causes the nut to move linearly in a forward or reverse direction along the longitudinal axis of the lead screw. The direction of motion of the nut is based on the direction of rotation of the lead screw. The nut 330a also comprises a slot 350a machined in a second face of the nut. The slot 350a is oriented in a direction perpendicular to the direction of motion of the nut.

Lever arm 340a comprises a pin at a first end of the lever arm. The pin is not visible in FIG. 3, but it is shown as reference number 420 in FIG. 4. The pin 420 is configured to slide in the slot 350a of the nut 330a to cause the lever arm to rotate in response to the linear motion of the nut. A second end of the lever arm, opposite the first end, is coupled to the canard 110a such that the rotation of the lever arm causes the canard to rotate, adjusting the angle of the canard as a flight control surface.

In some embodiments, the length of the lever arm 340a is selected to match the torque and rotational speed of the motor 230a to a required torque to be applied to the canard 110a based on the selected thread pitch of the lead screw.

Adjusting the length of the lever arm 340a allows for fine-tune of the performance of the system between standard (e.g., readily available, or non-custom) thread pitches of the lead screw 320a. For example, if the desired operating point (in terms of efficiency and torque/speed) falls between two standard thread pitches, then the length of the lever can be changed to move that operating point.

In some embodiments, the length of the lever arm 340a is selected to allow placement of the motor 230a at a desired location within the housing 210 of the actuation system 120.

Anti-rotation feature 360a is configured to prevent rotation of the nut 330a in response to the rotation of the lead screw 320a. The anti-rotation feature 360a comprises a groove or slot machined into a third face of the nut (opposite the second face) and a dowel. The groove is configured to receive the dowel (reference number 430 of FIG. 4) that is fixed to the housing 210 and oriented parallel to the longitudinal axis of the lead screw. When the dowel is seated in the grove, it prevents the nut from rotating while allowing it to move linearly in the direction along the longitudinal axis of the lead screw in response to rotation of the lead screw.

Cable 370a is configured to couple the motor 230a to the actuator controller 130 such that the controller 130 can provide the electrical signals to rotate the stepper motor by the desired angle.

Actuator assembly 220b, which is configured to control canard 110b, is substantially identical to actuator assembly 220a and is shown to include motor 230b, lead screw 320b, nut 330b, lever arm 340b, anti-rotation feature 360b, and cable 370b. Nut 330b also includes slot 350b (similar to slot 350a of assembly 220a), although it is not visible in this view.

In some embodiments, the lever arm, including the pins, is fabricated from stainless steel for the strength and corrosion resistant properties of that material.

In some embodiments, the lead screw is fabricated from aluminum to exploit the properties of lighter weight and wear resistance that aluminum provides. The inertia of the rotating components (e.g., the motor and the lead screw) are a significant factor in the transient response of the actuator so it is beneficial to minimize the weight of the lead screw. In some embodiments, the lead screw may be fabricated from a magnesium alloy, which is lighter still than aluminum, but more costly and difficult to machine.

In some embodiments, the nut is fabricated from bronze. In some embodiments, the bronze may be oil impregnated and sintered for compatibility with the aluminum lead screw and the steel pins of the lever arm. For example, the treated bronze is self-lubricating and resists galling and corrosion.

In some embodiments, the housing material is chosen for weight rather than strength since additional weight in the front of the UAV is generally desirable for flight stability. A heavier housing reduces the need for ballast to be added elsewhere. An additional advantage of the disclosed actuation system, is that the simplified and narrower linkages between the motor and canards reduce the amount of material that needs to be removed from the housing, allowing for a heavier housing which increases the utility of the housing as ballast.

Figure 4:
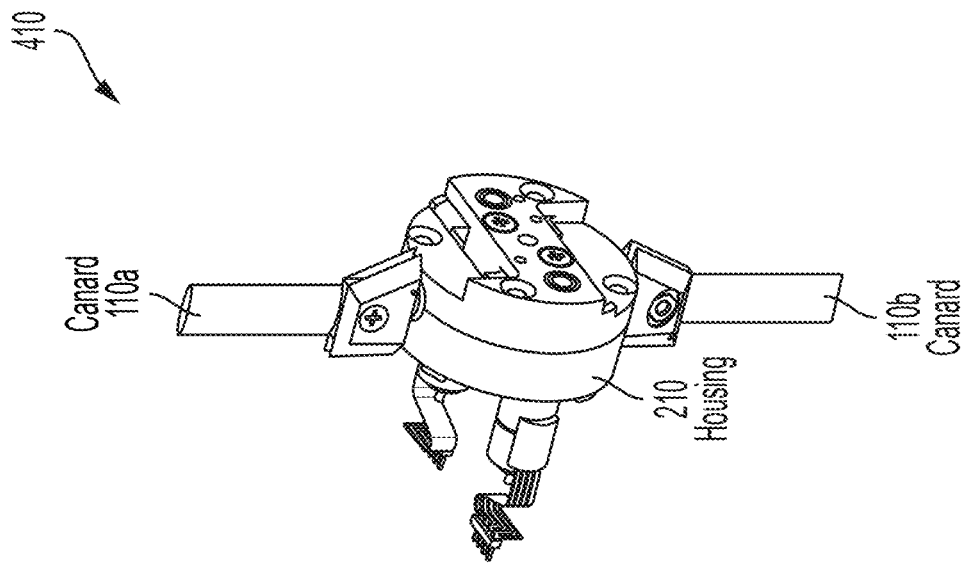
FIG. 4 provides an exploded view and an assembled view of the actuation system of FIG. 1, configured in accordance with certain embodiments of the present disclosure.
Figure 4:
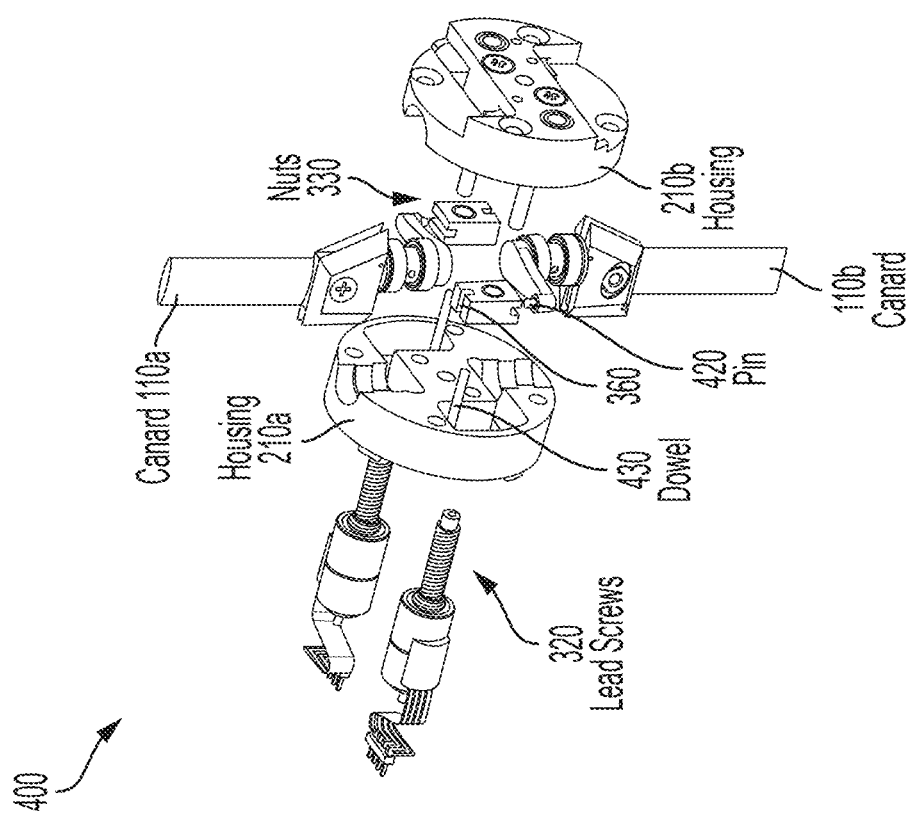

FIG. 4 provides an exploded view 400 and an assembled view 410 of the actuation system 120 of FIG. 1, configured in accordance with certain embodiments of the present disclosure. In the exploded view 400, the canards 110 are oriented vertically, and the housing is shown to be disassembled into two parts 210a and 210b. The figure also illustrates the components that are located within the housing, including the lead screws 320, nuts 330, and lever arms 340. In this figure, the pins 420, that are located at the ends of the lever arms and configured to slide in the slots 350 of the nuts 330, are visible. Also visible in this view are the dowels 430 that are fixed to the housing 210 and configured to seat into the groves 360 to prevent rotation of the nuts in response to rotation of the lead screw.

The assembled, or unexploded, view 410 shows the housing parts 210a and 210b assembled into the complete housing 210. In some embodiments, the assembled housing may be on the order of 1.5 inches in diameter and 1.5 inches in length.

As shown, the system 120 is configured to control two canards. In some embodiments, two systems may be employed, for example in a stacked fashion, to control a UAV having four canards.

Methodology

Figure 5:
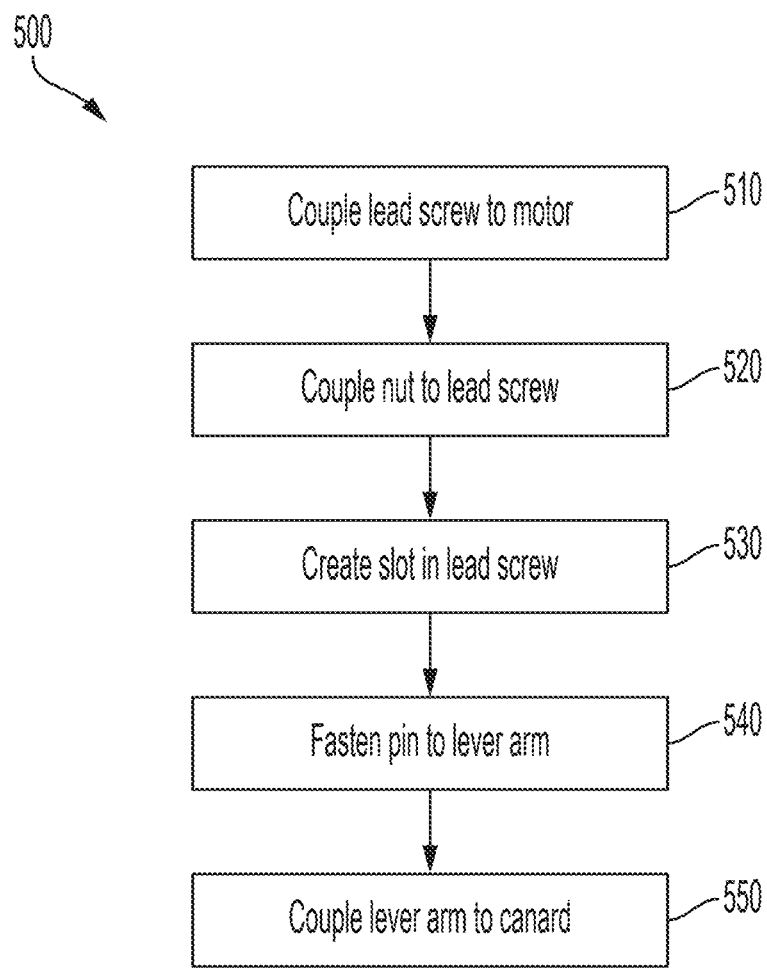
FIG. 5 is a flowchart illustrating a methodology for fabrication of the lead screw control actuation system of FIG. 1, in accordance with an embodiment of the present disclosure.

FIG. 5 is a flowchart illustrating a methodology 500 for fabrication of the lead screw control actuation system of FIG. 1, in accordance with an embodiment of the present disclosure. As can be seen, example method 500 includes a number of phases and sub-processes, the sequence of which may vary from one embodiment to another. However, when considered in aggregate, these phases and sub-processes form a process for fabrication of the lead screw control actuation system 120, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 5 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 500 commences, at operation 510, by attaching a lead screw to a motor. The motor is configured to rotate the lead screw, and the lead screw is configured to increase torque provided by the motor. In some embodiments, the thread pitch of the lead screw is selected to match torque and rotational speed of the motor to a required torque on the canard.

At operation 520, a nut is coupled to the lead screw. The nut comprises a threaded opening, in a first face of the nut, through which the lead screw is coupled such that the rotation of the lead screw causes the nut to move in a forward or reverse direction along a longitudinal axis of the lead screw. The direction of motion of the nut is based on the direction of rotation of the lead screw.

At operation 530, a slot is milled or otherwise created in a second face of the nut. The slot is oriented in a direction perpendicular to the direction of motion of the nut.

At operation 540, a pin is fastened or otherwise disposed at a first end of a lever arm. The pin is configured to slide in the slot of the nut to cause the lever arm to rotate in response to the motion of the nut.

At operation 550, a second end of the lever arm is coupled to a canard such that the rotation of the lever arm causes the canard to rotate. In some embodiments, the length of the lever arm is selected to match the torque and rotational speed of the motor to a required torque on the canard, based on a selected thread pitch of the lead screw. In some embodiments, the length of the lever arm is selected to allow placement of the motor at a desired location within a housing of the actuation system.

In some embodiments, additional operations may be performed, as previously described in connection with the system. For example, a groove is milled or otherwise created in a third face of the nut, the third face of the nut opposite the second face of the nut. The groove is configured to receive a dowel that is fixed to a housing of the actuation system. The dowel is configured to prevent rotation of the nut in response to the rotation of the lead screw.

In some embodiments, the lever arm is fabricated from stainless steel, the lead screw is fabricated from aluminum, and the nut is fabricated from bronze. In some embodiments, the motor is a stepper motor configured to provide incremental angular rotations in response to pulsed electrical signals.

Example System

Figure 6:
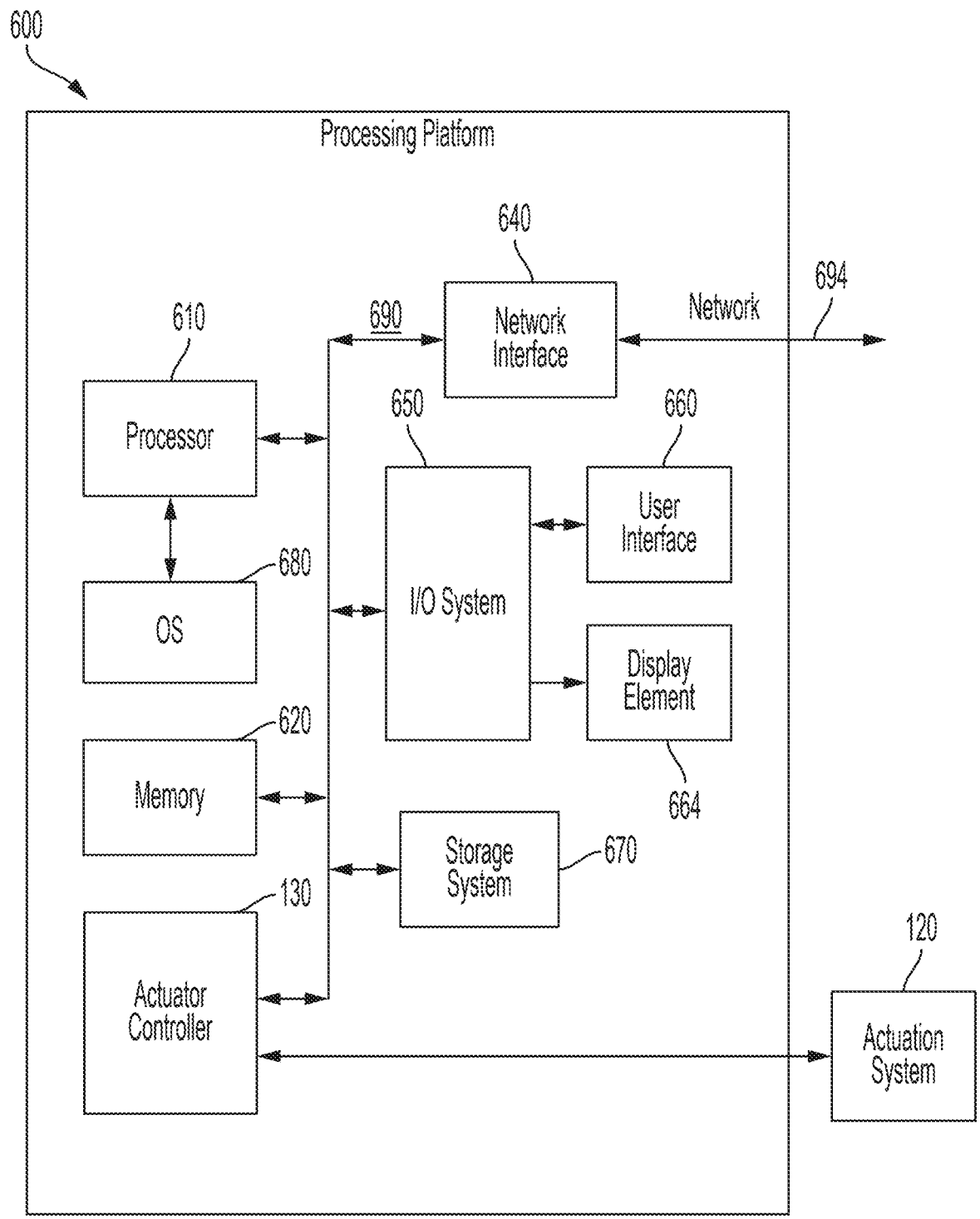
FIG. 6 is a block diagram of a processing platform for the actuation controller of FIG. 1, in accordance with an embodiment of the present disclosure.

FIG. 6 is a block diagram of a processing platform 600 for the actuation controller 130 of FIG. 1, in accordance with an embodiment of the present disclosure. In some embodiments, platform 600, or portions thereof, may be hosted on, or otherwise be incorporated into the electronic systems of an aircraft, rocket, or UAV.

In some embodiments, platform 600 may comprise any combination of a processor 610, memory 620, a network interface 640, an input/output (I/O) system 650, a user interface 660, a display element 664, a storage system 670, and actuator controller 130. As can be further seen, a bus and/or interconnect 690 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 610 can be any suitable processor, and may include one or more coprocessors or controllers, such as an audio processor, a graphics processing unit, or hardware accelerator, to assist in the execution of mission software and/or any control and processing operations associated with platform 600, including operation of the actuator controller 130. In some embodiments, the processor 610 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 610 may be implemented as a complex instruction set computer (CISC) or a reduced instruction set computer (RISC) processor. In some embodiments, processor 610 may be configured as an x86 instruction set compatible processor.

Memory 620 can be implemented using any suitable type of digital storage including, for example, flash memory and/or random access memory (RAM). In some embodiments, the memory 620 may include various layers of memory hierarchy and/or memory caches as are known to those of skill in the art. Memory 620 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 610 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of platform 600. I/O devices may include, but not be limited to, user interface 660 and display element 664. User interface 660 may include devices (not shown) such as a touchpad, cockpit display unit, keyboard, and mouse, etc., for example, to allow the user to control or configure the system. Display element 664 may be configured to display information to a user. I/O system 650 may include a graphics subsystem configured to perform processing of images for rendering on the display element 664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 610 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware, or software.

The actuator controller 130 is configured to provide control signals to the actuation system 120 to adjust the canards for a desired flight trajectory, as described previously.

In various embodiments, platform 600 may be implemented as a wireless system. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. For instance, in certain embodiments, the system may leverage processing resources provided by a remote computer system accessible via network 694. The computer software applications disclosed herein may include any number of different modules, submodules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC). Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is an actuation system for controlling a canard, the system comprising: a motor; a lead screw attached to the motor, the motor configured to rotate the lead screw, the lead screw configured to increase torque provided by the motor; a nut comprising a threaded opening in a first face of the nut through which the lead screw is coupled such that the rotation of the lead screw causes the nut to move in a forward or reverse direction along a longitudinal axis of the lead screw, the direction of motion of the nut based on the direction of rotation of the lead screw; the nut further comprising a slot in a second face of the nut, the slot oriented in a direction perpendicular to the direction of motion of the nut; and a lever arm comprising a pin at a first end of the lever arm, the pin configured to slide in the slot of the nut to cause the lever arm to rotate in response to the motion of the nut, wherein a second end of the lever arm is coupled to a canard such that the lever arm rotation causes the canard to rotate.

Example 2 includes the system of Example 1, wherein a thread pitch of the lead screw is selected to match torque and rotational speed of the motor to a required torque on the canard.

Example 3 includes the system of Examples 1 or 2, wherein a length of the lever arm is selected to match torque and rotational speed of the motor to a required torque on the canard based on a selected thread pitch of the lead screw.

Example 4 includes the system of any of Examples 1-3, wherein a length of the lever arm is selected to allow placement of the motor at a desired location within a housing of the actuation system.

Example 5 includes the system of any of Examples 1-4, wherein the nut comprises a groove in a third face of the nut, the third face of the nut opposite the second face of the nut, the groove configured to receive a dowel, the dowel fixed to a housing of the actuation system, the dowel configured to prevent rotation of the nut in response to the rotation of the lead screw.

Example 6 includes the system of any of Examples 1-5, wherein the lever arm is fabricated from stainless steel, the lead screw is fabricated from aluminum, and the nut is fabricated from bronze.

Example 7 includes the system of any of Examples 1-6, wherein the motor is a stepper motor configured to provide incremental angular rotations in response to pulsed electrical signals.

Example 8 includes the system of Example 7, comprising a processor configured to generate the pulsed electrical signals to control orientation of the canard over time to achieve a desired flight trajectory.

Example 9 is an aerial vehicle comprising: a first canard; a first actuation system configured to control the first canard; a second canard; and a second actuation system configured to control the second canard, wherein each of the first and second actuation control systems comprise: a motor, a lead screw attached to the motor, the motor configured to rotate the lead screw, the lead screw configured to increase torque provided by the motor, a nut comprising a threaded opening in a first face of the nut through which the lead screw is coupled such that the rotation of the lead screw causes the nut to move in a forward or reverse direction along a longitudinal axis of the lead screw, the direction of motion of the nut based on the direction of rotation of the lead screw, the nut further comprising a slot in a second face of the nut, the slot oriented in a direction perpendicular to the direction of motion of the nut, and a lever arm comprising a pin at a first end of the lever arm, the pin configured to slide in the slot of the nut to cause the lever arm to rotate in response to the motion of the nut, wherein a second end of the lever arm is coupled to the canard associated with the actuation system such that the lever arm rotation causes the canard to rotate.

Example 10 includes the aerial vehicle of Example 9, wherein the rotation of the first canard by the first actuation system is independent of the rotation of the second canard by the second actuation system to provide control of pitch and roll of the aerial vehicle.

Example 11 includes the aerial vehicle of Examples 9 or 10, comprising a housing configured to contain the first actuation system and the second actuation system, wherein the lead screw of the first actuation system and the lead screw of the second actuation system are located in a common plane, the common plane orthogonal to a longitudinal axis of the first and second canards.

Example 12 includes the aerial vehicle of any of Examples 9-11, wherein the motor is a stepper motor configured to provide incremental angular rotations in response to pulsed electrical signals.

Example 13 includes the aerial vehicle of Example 12, comprising a processor configured to generate the pulsed electrical signals to control orientation of the first and second canards over time to achieve a desired flight trajectory.

Example 14 is a method for fabrication of a control actuation system, the method comprising: attaching a lead screw to a motor, the motor configured to rotate the lead screw, the lead screw configured to increase torque provided by the motor; coupling a nut to the lead screw, the nut comprising a threaded opening in a first face of the nut through which the lead screw is coupled such that the rotation of the lead screw causes the nut to move in a forward or reverse direction along a longitudinal axis of the lead screw, the direction of motion of the nut based on the direction of rotation of the lead screw; creating a slot in a second face of the nut, the slot oriented in a direction perpendicular to the direction of motion of the nut; fastening a pin at a first end of a lever arm, the pin configured to slide in the slot of the nut to cause the lever arm to rotate in response to the motion of the nut; and coupling a second end of the lever arm to a canard such that the rotation of the lever arm causes the canard to rotate.

Example 15 includes the method of Example 14, comprising selecting a thread pitch of the lead screw to match torque and rotational speed of the motor to a required torque on the canard.

Example 16 includes the method of Examples 14 or 15, comprising selecting a length of the lever arm to match torque and rotational speed of the motor to a required torque on the canard based on a selected thread pitch of the lead screw.

Example 17 includes the method of any of Examples 14-16, comprising selecting a length of the lever arm to allow placement of the motor at a desired location within a housing of the actuation system.

Example 18 includes the method of any of Examples 14-17, comprising creating a groove in a third face of the nut, the third face of the nut opposite the second face of the nut, the groove configured to receive a dowel, the dowel fixed to a housing of the actuation system, the dowel configured to prevent rotation of the nut in response to the rotation of the lead screw.

Example 19 includes the method of any of Examples 14-18, wherein the lever arm is fabricated from stainless steel, the lead screw is fabricated from aluminum, and the nut is fabricated from bronze.

Example 20 includes the method of any of Examples 14-19, wherein the motor is a stepper motor configured to provide incremental angular rotations in response to pulsed electrical signals.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An actuation system for controlling a canard, the system comprising:
   a motor;
   a lead screw attached to the motor, the motor configured to rotate the lead screw, the lead screw configured to increase torque provided by the motor;
   a nut comprising a threaded opening in a first face of the nut through which the lead screw is coupled such that the rotation of the lead screw causes the nut to move in a forward or reverse direction along a longitudinal axis of the lead screw, a direction of motion of the nut based on a direction of rotation of the lead screw;
   the nut further comprising a slot in a second face of the nut, the slot oriented in a direction perpendicular to the direction of motion of the nut; and
   a lever arm comprising a pin at a first end of the lever arm, the pin configured to slide in the slot of the nut to cause the lever arm to rotate in response to the motion of the nut, wherein a second end of the lever arm is coupled to a canard such that the lever arm rotation causes the canard to rotate;
   wherein the nut comprises a groove in a third face of the nut, the third face of the nut opposite the second face of the nut, the groove configured to receive a dowel, the dowel fixed to a housing of the actuation system, the dowel configured to prevent rotation of the nut in response to the rotation of the lead screw.

2. The system of claim 1, wherein a thread pitch of the lead screw is selected to match torque and rotational speed of the motor to a required torque on the canard.

3. The system of claim 1, wherein a length of the lever arm is selected to match torque and rotational speed of the motor to a required torque on the canard based on a selected thread pitch of the lead screw.

4. The system of claim 1, wherein a length of the lever arm is selected to allow placement of the motor at a desired location within a housing of the actuation system.

5. The system of claim 1, wherein the lever arm is fabricated from stainless steel, the lead screw is fabricated from aluminum, and the nut is fabricated from bronze.

6. The system of claim 1, wherein the motor is a stepper motor configured to provide incremental angular rotations in response to pulsed electrical signals.

7. The system of claim 6, comprising a processor configured to generate the pulsed electrical signals to control orientation of the canard over time to achieve a desired flight trajectory.

8. An aerial vehicle comprising:
   a first canard;
   a first actuation system configured to control the first canard;
   a second canard; and
   a second actuation system configured to control the second canard, wherein each of the first and second actuation control systems comprise:
   a motor,
   a lead screw attached to the motor, the motor configured to rotate the lead screw, the lead screw configured to increase torque provided by the motor,
   a nut comprising a threaded opening in a first face of the nut through which the lead screw is coupled such that the rotation of the lead screw causes the nut to move in a forward or reverse direction along a longitudinal axis of the lead screw, a direction of motion of the nut based on a direction of rotation of the lead screw,
   the nut further comprising a slot in a second face of the nut, the slot oriented in a direction perpendicular to the direction of motion of the nut, and
   a lever arm comprising a pin at a first end of the lever arm, the pin configured to slide in the slot of the nut to cause the lever arm to rotate in response to the motion of the nut, wherein a second end of the lever arm is coupled to the canard associated with the actuation system such that the lever arm rotation causes the canard to rotate;
   wherein the nut comprises a groove in a third face of the nut, the third face of the nut opposite the second face of the nut, the groove configured to receive a dowel, the dowel fixed to a housing of the actuation system, the dowel configured to prevent rotation of the nut in response to the rotation of the lead screw.

9. The aerial vehicle of claim 8, wherein the rotation of the first canard by the first actuation system is independent of the rotation of the second canard by the second actuation system to provide control of pitch and roll of the aerial vehicle.

10. The aerial vehicle of claim 8, comprising a housing configured to contain the first actuation system and the second actuation system, wherein the lead screw of the first actuation system and the lead screw of the second actuation system are located in a common plane, the common plane orthogonal to a longitudinal axis of the first and second canards.

11. The aerial vehicle of claim 8, wherein the motor is a stepper motor configured to provide incremental angular rotations in response to pulsed electrical signals.

12. The aerial vehicle of claim 11, comprising a processor configured to generate the pulsed electrical signals to control orientation of the first and second canards over time to achieve a desired flight trajectory.

13. A method for fabrication of a control actuation system, the method comprising:
   attaching a lead screw to a motor, the motor configured to rotate the lead screw, the lead screw configured to increase torque provided by the motor;
   coupling a nut to the lead screw, the nut comprising a threaded opening in a first face of the nut through which the lead screw is coupled such that the rotation of the lead screw causes the nut to move in a forward or reverse direction along a longitudinal axis of the lead screw, a direction of motion of the nut based on a direction of rotation of the lead screw;
   creating a slot in a second face of the nut, the slot oriented in a direction perpendicular to the direction of motion of the nut;
   creating a groove in a third face of the nut, the third face of the nut opposite the second face of the nut, the groove configured to receive a dowel, the dowel fixed to a housing of the actuation system, the dowel configured to prevent rotation of the nut in response to the rotation of the lead screw;

fastening a pin at a first end of a lever arm, the pin configured to slide in the slot of the nut to cause the lever arm to rotate in response to the motion of the nut; and coupling a second end of the lever arm to a canard such that the rotation of the lever arm causes the canard to rotate.

14. The method of claim 13, comprising selecting a thread pitch of the lead screw to match torque and rotational speed of the motor to a required torque on the canard.

15. The method of claim 13, comprising selecting a length of the lever arm to match torque and rotational speed of the motor to a required torque on the canard based on a selected thread pitch of the lead screw.

16. The method of claim 13, comprising selecting a length of the lever arm to allow placement of the motor at a desired location within a housing of the actuation system.

17. The method of claim 13, wherein the lever arm is fabricated from stainless steel, the lead screw is fabricated from aluminum, and the nut is fabricated from bronze.

18. The method of claim 13, wherein the motor is a stepper motor configured to provide incremental angular rotations in response to pulsed electrical signals.

* * * * *